United States Patent [19]

Mecherle

[11] Patent Number: 5,283,801
[45] Date of Patent: Feb. 1, 1994

[54] EXTERNAL RESONANT RING CAVITY FOR GENERATING HIGH-PEAK-POWER LASER PULSES

[75] Inventor: George S. Mecherle, Hawthorne, Calif.

[73] Assignee: TRW Inc., Redondo Beach, Calif.

[21] Appl. No.: 891,973

[22] Filed: May 26, 1992

[51] Int. Cl.$^5$ .................................. H01S 3/083
[52] U.S. Cl. ........................... 372/94; 372/93; 372/107; 372/71; 372/27; 372/30
[58] Field of Search .............. 372/94, 93, 71, 27, 372/107, 30

[56] References Cited

U.S. PATENT DOCUMENTS

| | | | |
|---|---|---|---|
| 4,247,831 | 1/1981 | Lindop | 372/94 |
| 4,405,236 | 9/1983 | Mitsuhashi et al. | 372/94 |
| 4,833,683 | 5/1989 | Ury et al. | 372/94 |

FOREIGN PATENT DOCUMENTS 0312686 12/1988 Japan ............................. 372/94
2023919 1/1980 United Kingdom ............ 372/94

OTHER PUBLICATIONS

Rayman, Marc D. et al., "Modulation Techniques for Deep-Space Pulse-Position Modulation (PPM) Optical Communication," SPIE vol. 885 Free-Space Laser Communication Technologies, 1988, pp. 32-35.

Henderson, D. M. et al., "Optical Coupling Modulation in Traveling Wave Cavities," NASA Final Report, Contract NAS 5-20623, Dec. 1976, pp. J2-J12.

*Primary Examiner*—Georgia Y. Epps
*Attorney, Agent, or Firm*—Ronald L. Taylor

[57] ABSTRACT

A high-Q, gainless external resonant ring cavity for generating high peak power pulses from semiconductor laser diodes and other low-power, continuous-wave laser sources. The resonant ring cavity stores laser energy from a continuous-wave laser source and periodically dumps the stored laser energy in pulses having peak power levels many times greater than that of the laser source.

10 Claims, 1 Drawing Sheet

EXTERNAL RESONANT RING CAVITY FOR GENERATING HIGH-PEAK-POWER LASER PULSES

BACKGROUND OF THE INVENTION

This invention relates generally to semiconductor laser diodes and, more particularly, to techniques for increasing the peak power levels of semiconductor laser diodes.

Semiconductor laser diodes are particularly well suited as continuous-wave laser light sources for a variety of optical systems, such as optoelectronic logic circuits, fiber-optic communication systems, and for optically pumping solid state lasers. Laser diodes are well suited for these applications because of their small size, high power efficiency, reliability, direct current modulation and operation at wavelengths having low transmission and dispersion losses in glass fiber optics. However, for pulsed applications requiring relatively high peak power levels, such as laser rangefinders, laser designators, and deep-space and satellite-submarine communication systems, solid-state lasers, such as neodymium-doped YAG lasers, are preferred over semiconductor laser diodes.

Solid-state lasers generate high peak power pulses using energy storage mechanisms, such as cavity dumping or Q-switching, which are easily implemented within the mechanical cavity structure of the solid-state laser. The resonant cavity of the semiconductor laser diode is not well suited for implementing these types of energy storage mechanisms because of facet power limitations and difficulties associated with placing elements within the laser diode cavity. Accordingly, there has been a need for an energy storage mechanism for increasing the peak power levels of semiconductor laser diodes. The present invention is directed to this end.

SUMMARY OF THE INVENTION

The present invention resides in a high-Q, gainless external resonant ring cavity for generating high peak power pulses from semiconductor laser diodes and other low-power, continuous-wave laser sources. The resonant ring cavity stores laser energy from a continuous-wave laser source and periodically dumps the stored laser energy in pulses having peak power levels many times greater than that of the laser source.

In a preferred embodiment of the present invention, the resonant ring cavity includes a partially-reflecting input mirror, an electro-optical switch, an output polarizer and a totally-reflecting mirror. Laser light is coupled into the resonant ring cavity through the partially-reflecting input mirror. The input mirror acts as a one-way directional coupler, allowing the resonant ring cavity to be optically pumped by the laser source while preventing any loss of the circulating laser energy during resonance. Laser light circles unidirectionally in a clockwise direction and is reflected by the partially-reflecting mirror, the output polarizer, and the totally-reflecting mirror. The circulating or stored laser energy continues to accumulate or build up in the resonant ring cavity until a high peak power pulse is to be generated. The electro-optical switch is then energized to rotate the polarization vector of the laser light. The output polarizer is transmissive to the rotated laser light, allowing the stored laser energy to be dumped from the resonant ring cavity in the form of a high peak power pulse.

It will be appreciated from the foregoing that the present invention represents a significant advance in the field of semiconductor laser diodes. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
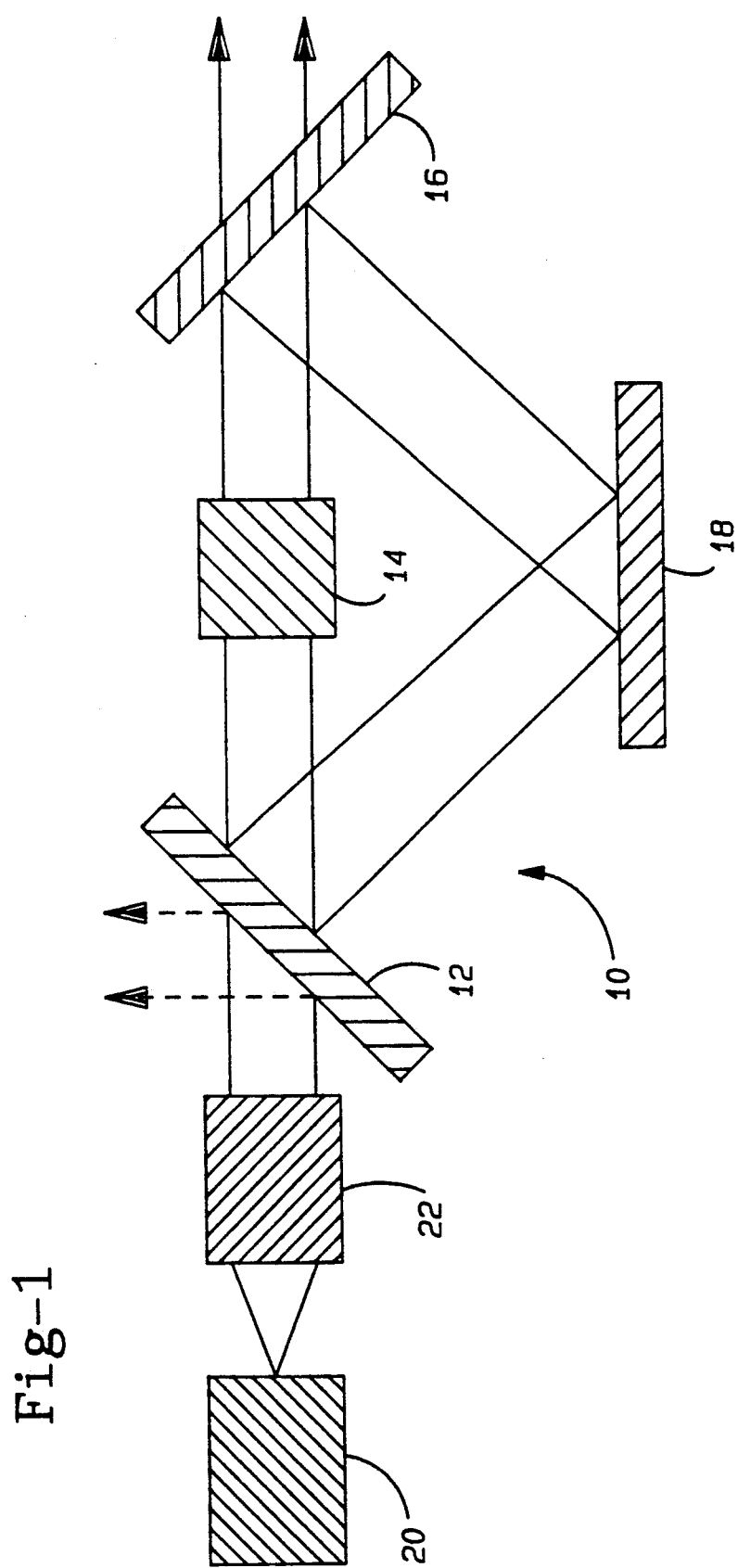
FIG. 1 is a schematic diagram illustrating the high-Q, gainless external resonant ring cavity of the present invention.

As shown in the drawings for purposes of illustration, the present invention is embodied in a high-Q, gainless external resonant ring cavity for generating high peak power pulses from semiconductor laser diodes and other low-power, continuous-wave laser sources. The resonant ring cavity stores laser energy from a continuous-wave laser source and periodically dumps the stored laser energy in pulses having peak power levels many times greater than that of the laser source.

FIG. 1 illustrates a high-Q, gainless external resonant ring cavity 10 in accordance with a preferred embodiment of the present invention. The resonant ring cavity 10 includes, in clockwise order, a partially-reflecting input mirror 12, an electro-optical switch 14, an output polarizer 16 and a totally-reflecting mirror 18. A continuous-wave laser source 20 optically pumps the resonant ring cavity 10 with laser light that has been collimated by collimator 22.

The collimated laser light is coupled into the resonant ring cavity 10 through the partially-reflecting input mirror 12. The input mirror 12 acts as a one-way directional coupler, allowing the resonant ring cavity 10 to be optically pumped by the laser source 20 while preventing any loss of the circulating laser energy during resonance. Laser light circles unidirectionally in a clockwise direction and is reflected by the partially-reflecting mirror 12, the output polarizer 16, and the totally-reflecting mirror 18. The circulating or stored laser energy continues to accumulate or build up in the resonant ring cavity 10 until a high peak power pulse is to be generated. The electro-optical switch 14 is then energized to rotate the polarization vector of the laser light. The output polarizer 16 is transmissive to the rotated laser light, allowing the stored laser energy to be dumped from the resonant ring cavity 10 in the form of a high peak power pulse.

For efficient operation of the resonant ring cavity 10, the cavity must operate with very low losses and nearly all of the laser energy incident on the partially-reflecting input mirror 12 must be coupled into the cavity. To maximize coupling of the incident laser energy into the resonant ring cavity 10, the input mirror 12 should have a low reflectivity. However, to minimize the loss of circulating laser energy through the input mirror 12, the input mirror should have a high reflectivity. The optimum value of reflectivity for the input mirror 12 can be shown to be equal to the transmissivity of the resonant ring cavity 10. Cavity transmissivity (T = 1-cavity loss) is a fixed value that depends on the quality of the optical components used in fabricating the cavity.

The resonant ring cavity 10 operates efficiently only at wavelengths for which a standing-wave pattern can be established in the cavity. This cavity resonance requires that the round trip cavity length be precisely maintained at an integral number of half wavelengths of the laser light. The resonant cavity 10 can be tuned to a desired wavelength by varying the spacing of the mirrors 12, 18 and the output polarizer 16. A servo loop (not shown) can be used to control the cavity length based on minimizing the reflected light from the input mirror 12.

The electro-optical switch 14 must be a low loss device and be able to rotate the polarization vector within a small fraction of the pulse width. An example of a suitable electro-optical switch 14 is one fabricated from lithium niobate ($LiNbO_3$). Rather than outcoupling the stored laser energy through the output polarizer 16, the stored laser energy can be outcoupled by an angularly-rotating, totally-reflecting output mirror or an acousto-optic Bragg cell. The laser source 20 is preferably a semiconductor laser diode having a small-bandwidth, single-longitudinal-mode output. An intracavity mirror or lens (not shown) can be used to refocus the light after each pass around the cavity.

The peak power enhancement of the resonant ring cavity 10 is:

$$\text{Power} = \eta^* P_{cw}(1 - T^{N+1})/(1 - T),$$

where $\eta$ is the output coupling efficiency of the cavity, $P_{cw}$ is the power output of the continuous-wave laser source 20, T is the round trip cavity transmissivity or throughput (T = 1-cavity loss), and N is the number of cavity round trips. The energy storage efficiency of the resonant ring cavity 10 is:

$$\text{Efficiency} = (\eta/N)(1 - T^{N+1})/(1 - T).$$

The output pulse width is L/c and the pulse repetition period is NL/c, where L is the round trip cavity length and c is the velocity of light. To minimize the adverse effects of a finite rise time, the switching speed of the electro-optical switch 14 should be less than about 10% of the pulse width.

As an example, a resonant ring cavity 10 having a cavity loss of 1%, an output coupling efficiency of 100% and 100 cavity round trips produces a peak power enhancement of 64. Therefore, a peak output of 64 watts can be generated from a 1 watt laser source 20. The energy storage efficiency in this example is 64%. When a resonator ring cavity 10 with an efficiency of 50% is coupled to a semiconductor laser diode with an efficiency of 50-70%, an overall efficiency of 25-35% is achieved. This overall efficiency is a factor of three times better than that of a neodymium-doped YAG laser.

From the foregoing, it will be appreciated that the present invention represents a significant advance in the field of semiconductor laser diodes. Although a preferred embodiment of the invention has been shown and described, it will be apparent that other adaptations and modifications can be made without departing from the spirit and scope of the invention. Accordingly, the invention is not to be limited, except as by the following claims.

I claim:

1. An energy storage mechanism for generating high-peak-power laser pulses for use in conjunction with a laser light from a continuous wave laser source, comprising:

a high-Q, gainless external resonant ring cavity for concurrently accumulating and storing laser energy;

means or coupling the laser light from the continuous wave source into the high-Q, gainless resonant ring cavity; and means for periodically dumping the stored laser energy in high peak power pulses.

2. A high-Q, gainless external resonant ring cavity for generating high-peak-power laser pulses for use in conjunction with a continuous wave laser source, comprising:

a partially-reflecting input mirror for coupling laser light from the laser source into the resonant ring cavity;

an output polarizer transmissive to rotated laser light;

an electro-optical switch positioned between the partially-reflecting input mirror and the output polarizer for rotating the polarization of the laser light; and a totally-reflecting mirror;

wherein laser energy is concurrently accumulated and stored in the resonant ring cavity, by allowing laser light to enter through the input mirror, and periodically dumped from the cavity in high peak power pulses, the electro-optical switch being energized for each pulse to rotate the polarization of the laser light and allow the stored laser energy to exit through the output polarizer.

3. The high-Q, gainless external resonant ring cavity as set forth in claim 2, wherein the reflectivity of the input mirror is equal to the transmissivity of the resonant ring cavity.

4. The high-Q, gainless external resonant ring cavity as set forth in claim 2, wherein the round trip cavity length is precisely maintained at an integral number of half wavelengths of the laser light.

5. The high-Q, gainless external resonant ring cavity as set forth in claim 2, wherein the resonant ring cavity is tuned to a desired wavelength by varying the spacing of the mirrors and output polarizer.

6. A method for generating high-peak-power laser pulses for use in conjunction with laser light from a continuous wave laser source, comprising the steps of:

coupling the laser light to a high-Q, gainless external resonant ring cavity;

concurrently accumulating and storing laser energy in the high-Q, gainless external resonant ring cavity; and periodically dumping the stored laser energy in high peak power pulses by activating a Q switch.

7. The method according to claim 6, wherein the step of coupling the laser light to the resonant ring cavity includes the step of collimating the light before introduction to the resonant ring cavity.

8. The method according to claim 6, wherein the step of concurrently accumulating and storing laser energy includes the step of tuning the resonant ring cavity to minimize laser energy loss.

9. The method according to claim 6, wherein the step of dumping the stored laser energy includes the step of polarizing the laser light to enable the laser light to be released from the resonant ring cavity.

10. The high-Q, gainless external resonant ring cavity as set forth in claim 2, which further comprises a collimator for collimating laser light from the laser source before entry to the resonant ring cavity.

* * * * *